March 3, 1964 — J. K. NICKERSON ETAL — 3,123,633
PRODUCTION OF DIMETHYLTEREPHTHALATE
Filed Oct. 16, 1961
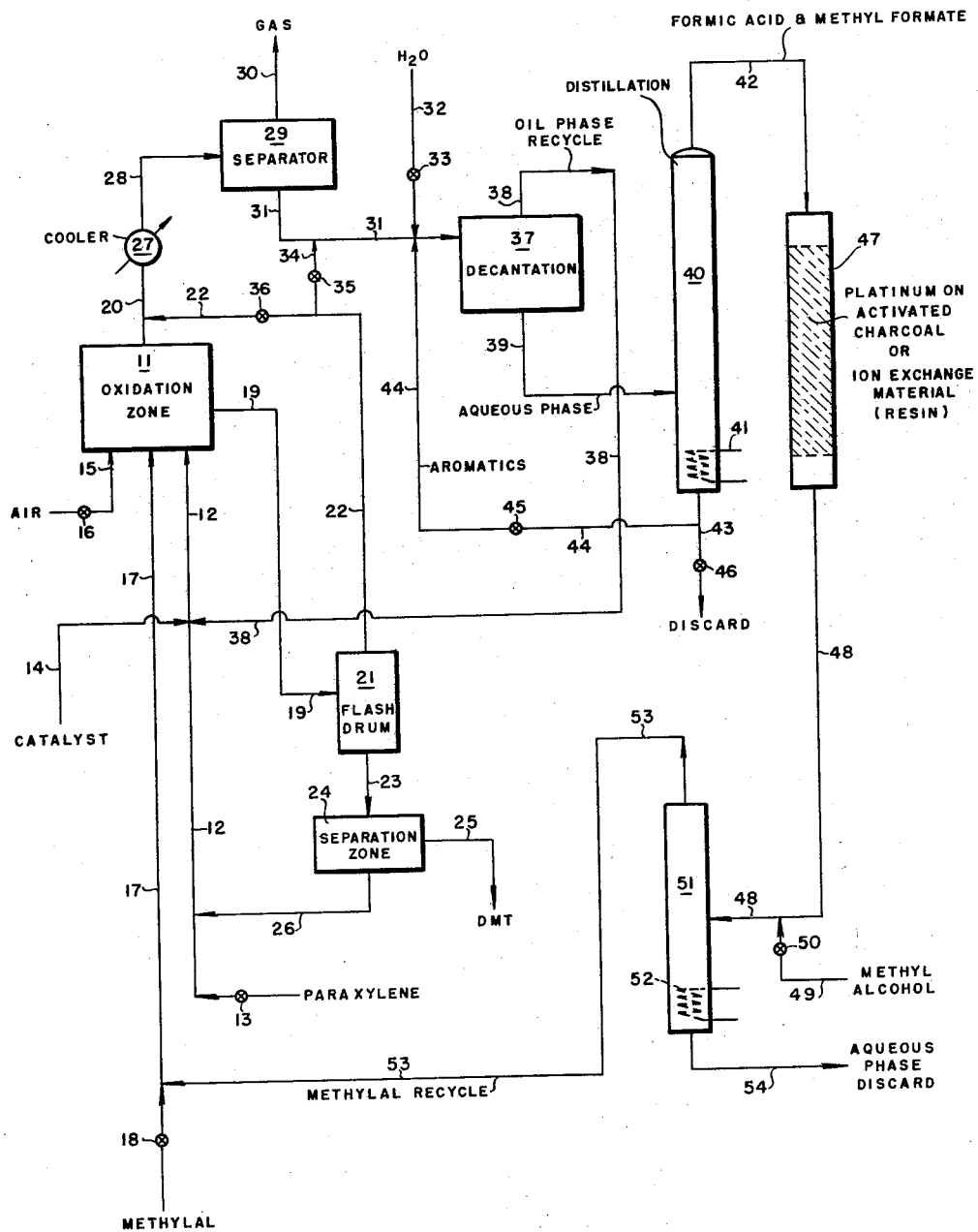
INVENTORS.
JAMES K. NICKERSON,
ROBERT E. PENNINGTON,
BY
ATTORNEY.

United States Patent Office 3,123,633
Patented Mar. 3, 1964

3,123,633
PRODUCTION OF DIMETHYLTEREPHTHALATE
James K. Nickerson and Robert E. Pennington, Baytown, Tex., assignors, by mesne assignments, to Esso Research and Engineering Company, Elizabeth, N.J., a corporation of Delaware
Filed Oct. 16, 1961, Ser. No. 145,399
4 Claims. (Cl. 260—475)

The present invention is directed to the production of dimethylterephthalate.

The present invention may be briefly described as a method wherein a p-xylene is reacted in a liquid phase in a reaction zone at a reaction temperature in the presence of methylal with a free oxygen-containing gas to obtain a product containing dimethyl terephthalate. The product is recovered and the ester is obtained from said product.

The feed stock for the present invention is p-xylene.

The amount of methylal employed in the practice of the present invention will usually be one mol per mol of aromatic carboxylic acid, such as the dicarboxylic acid. This produces one mol of diester and one mol of water. This is to be contrasted with conventional operations wherein 2 mols of alkanol are reacted with one mol of the aromatic carboxylic acid to produce one mol of the diester and 2 mols of water.

Ordinarily, an amount from about ½ to about 2 mols of acetal may be used per mol equivalent of alkyl groups to be oxidized. Thus, if it is desired to convert a xylene to the corresponding methyl diester, there may be used, for example, from about 1 to about 4 mols of methylal per mol of xylene.

In the simultaneous oxidation and esterification of polyalkyl benzene, the reaction is conducted in the liquid phase and it is preferred to maintain the reactants in the liquid phase. The methylal may be introduced with the feed stock continuously into an esterfication-oxidation zone.

Catalysts are useful in the present invention and the catalysts employed are the soluble polyvalent metal catalysts such as soluble cobalt salts. Cobalt naphthenate is preferred. At least a catalytically effective amount of catalyst should be employed. Thus, an amount of catalyst compound may be used which is sufficient to maintain about 0.05 to about 0.8 weight percent of catalyst in soluble catalytically effective form in the liquid reaction mixture. Larger amounts of catalyst (e.g., up to about 10 percent) may be employed, if desired, but this is not absolutely necessary. The amount of catalyst to be used, as set forth above, is calculated with respect to the weight of the heavy metal of the catalyst compound and the polyalkyl aromatic hydrocarbon feed stock.

The reaction conditions to be employed are, in general, the reaction conditions that are normally employed in the liquid phase air oxidation of polyalkyl aromatic hydrocarbons in the substantial absence of liquid methylal. However, it is contemplated, in accordance with the present invention, that when such conditions are employed in the presence of liquid methylal, both oxidation and esterification reactions are promoted while oxidative decomposition of the liquid methylal to liquid nonaromatics is largely inhibited and oxidation of the methylal to gaseous products, such as carbon dioxide and water, is almost completely suppressed.

The reaction conditions to be employed should include a temperature within the range of about 140° C. to about 290° C. The pressure employed should be sufficient to maintain the methylal substantially exclusively in liquid phase. Accordingly, for temperatures within the range of about 140° C. to about 290° C., the pressure employed may be, correspondingly, within the range of about 200 to 1000 p.s.i.g.

The oxidizing medium to be employed is oxygen, including pure oxygen, air, etc. Although the oxygen charge rate is not particularly critical, for convenience of reaction it is generally preferable to employ an oxygen charge rate such that, with the gas-liquid contacting available, an oxygen utilization of 50 percent or greater is accomplished. The oxygen charge rate should be correlated with the rate of reaction that is obtainable. With poor gas-liquid contacting, the reaction rate will be slow and comparatively low oxygen flow rates should be employed. With good agitation, good gas-liquid contacting is obtained whereby substantially higher reaction rates can be achieved and correspondingly higher oxygen flow rates can be utilized.

Preferably, the oxygen charge rate will be balanced with oxygen consumption so that the tail gas will be substantially completely free from unreacted oxygen. When the source of molecular oxygen is air, it is desirable that the tail gas contain not more than about 15 volume percent of oxygen. Oxygen flow rates which will cause entrainment of excessive amounts of methylal should be avoided.

While methylal is the preferred acetal to be employed in the present invention, other acetals may be used. Thus, di-ethoxy methane, di-propoxy methane, di-ethoxy ethane, di-propoxy propane, methoxy ethoxy ethane, methoxy propoxy methane, and the like, are suitably employed when it is desired to produce other reaction products besides the dimethylterephthalate obtained by oxidation-esterification of xylene and methylal.

The present invention will be further illustrated by reference to the drawing in which the single figure is a flow diagram of a preferred mode.

Referring now to the drawing, numeral 11 designates a combination esterification-oxidation zone into which there is introduced by way of line 12 a suitable feed stock such as paraxylene. Valve 13 connects line 12 to a source of paraxylene, not shown. Connecting into line 12 is line 14 through which soluble heavy metal catalyst may be introduced. Zone 11 is provided with line 15, controlled by valve 16, by way of which air or other free oxygen-containing gas may be introduced into the system. Methylal or any other suitable acetal may be introduced into zone 11 by way of line 17. Line 17 is provided with valve 18 which connects into a source of methylal, not shown.

Under the reaction conditions employed in zone 11, which may include a contact time within the range from about 600 to about 6000 seconds, polyalkyl benzene and acetal are converted to esters of aromatic carboxylic acids and other partially oxidized products. Thus, provision is made to remove from zone 11 a liquid product by way of line 19 and a gaseous product by way of line 20. The liquid product removed by line 19 is introduced thereby into a flash drum 21 from whence there is removed by line 22 flashed products including partially oxidized products which are discharged into line 20 for further processing, as will be described. The unflashed material is discharged from drum 21 by line 23 into a separation zone 24 from whence dimethylterephthalate is recovered by line 25. Separation zone 24 may suitably be a crystallization zone with the dimethylterephthalate separated from the unreacted xylene which is withdrawn by line 26 which connects into line 12.

The gaseous products in line 20 are introduced into a suitable cooler 27 to liquefy the condensables therein for separation of the noncondensables therefrom. Thus, the cooled and liquefied gaseous products discharge by line 28 into a separator 29 from whence the tail gas is discharged by line 30. The condensables from the gaseous products are withdrawn from separator 29 by line 31 and optionally may have water added thereto by line 32, controlled by valve 33.

In some instances, it may be desirable to introduce the flashed material from drum 21 into line 31, at least in part, and this may be done by branch line 34, controlled by valve 35. Under these circumstances, valve 36 in line 22 may be closed or throttled.

The condensables separated from the gaseous products are then introduced into line 31 into decantation zone 37 which allows an oil phase to separate which is withdrawn by line 38 and recycled thereby to line 12 for introduction into oxidation zone 11. The aqueous phase from zone 37 is withdrawn by line 39 and discharged thereby into a distillation zone 40 provided with a heating means illustrated by steam coil 41. In zone 40 temperature and pressure conditions are adjusted to allow distillation of methylal, formaldehyde, formic acid, methyl formate, and water from the material introduced into line 40 for discharge therefrom by line 42. Unreacted xylene in the aqueous phase is discharged by line 43 and may suitably be recycled to line 31 by way of line 44, controlled by valve 45. Optionally, this small amount of xylene may be discharged by opening valve 46 in line 43.

The formic acid and methyl formate in line 42 are introduced thereby into a zone 47 which may contain a catalyst such as platinum on activated charcoal, or may contain a basic or acid ion exchange material which may be a resin. Zone 47 destroys formic acid and methyl formate or removes them either by conversion or adsorption. In zone 47 the remaining methylal and formaldehyde are discharged therefrom by line 48. The formaldehyde in line 48 has introduced into it by line 49, controlled by valve 50, a sufficient amount of methyl alcohol, such as from about 2 to about 6 mols per mol of formaldehyde to cause reaction of the alcohol with the formaldehyde to produce methylal. The stream containing the methylal is then discharged into distillation zone 51 provided with a heating means illustrated by steam coil 52. The methylal is recovered from zone 51 by line 53 which connects into line 17. An aqueous phase discard, which may contain excess methanol introduced by line 49, is removed from zone 51 by line 54.

From the foregoing description taken with the drawing, a method is provided for simultaneous oxidation and esterification of a polyolefin aromatic hydrocarbon with the production of methylal, utilizing the products of reaction as a feed stock for converting alcohol to methylal.

In order to illustrate the present invention, reference is had to Table I wherein typical stream analyses from the flow sheet of FIG. I are given, the numerals designating the portion of the flow diagram wherein the stream is obtained.

TABLE I

*Typical Steam Analyses, Weight Percent*

| | 11 Reactor Liquid | 26 Heavy Recycle | 20 Reactor Vapors | 38 Xylene Recycle | 17 Methylal Recycle | 46 Effluent Water |
|---|---|---|---|---|---|---|
| P-Tolyl P-Toluate | 3.0 | 2.5 | 0.0 | 0.0 | | |
| P/P' Ditolyl | 0.7 | 0.6 | 0.0 | 0.0 | | |
| Dimethylterephthalate | 26.4 | 16.9 | 0.8 | 3.0 | | |
| Monomethtlterephthalate | 6.3 | 5.3 | 0.1 | 0.0 | | |
| Methyl P-Toluate | 40.6 | 39.6 | 6.4 | 23.0 | | |
| P-Toluic Acid | 9.2 | 8.0 | 0.6 | 1.0 | | |
| Benzoic Acid | 0.1 | 0.1 | 0.1 | 0.3 | | |
| P-Tolualdehyde | 1.3 | 1.4 | 0.4 | 1.3 | | |
| P-Tolyl Alcohol | 1.0 | 0.9 | 0.0 | 0.2 | | |
| P-Xylene | 5.6 | 18.8 | 9.7 | 61.4 | 1.3 | |
| Toluene | 0.0 | 0.0 | 0.4 | 0.9 | 0.2 | |
| Methyl Benzoate | 2.1 | 2.0 | 0.3 | 0.8 | 0.0 | |
| Methylal | 0.4 | 0.4 | 39.8 | 2.8 | 93.8 | |
| Methyl Acetate | 0.1 | 0.1 | 0.6 | 0.3 | 1.1 | |
| Methyl Formate | 0.1 | 0.1 | 1.9 | 1.7 | 3.2 | |
| Formic Acid | 0.0 | 0.0 | 0.0 | 0.0 | 0.0 | |
| Acetic Acid | 0.0 | 0.0 | 0.1 | 0.6 | 0.1 | 0.3 |
| Methanol | 2.9 | 3.3 | 3.1 | 2.1 | 0.0 | 2.4 |
| Formaldehyde | 0.0 | 0.0 | 0.6 | 0.0 | 0.0 | 1.0 |
| Water | 0.2 | 0.0 | 5.7 | 0.6 | 0.3 | 96.3 |
| $O_2$ | | | 0.8 | | | |
| $CO_2$ | | | 1.5 | | | |
| $CO$ | | | 0.6 | | | |
| $N_2$ | | | 26.5 | | | |
| | 100.0 | 100.0 | 100.0 | 100.0 | 100.0 | |

In order to illustrate the present invention further, the following example is given.

*Example I.*—There is introduced into a reaction zone, such as zone 11, 5 parts of fresh p-xylene along with 123 parts of heavy recycle, such as given in Table I, along with 22 parts of xylene recycle, such as in Table I, and 57 parts of methylal. Forty-one parts of air are employed. Removed from the reaction zone 11 are 115 parts of vapor and 128 parts of liquid. From the product there are obtained 10 parts of dimethylterephthalate and 118 parts of the heavy recycle to make the 123 parts introduced into zone 11. From the condensate recovery stream there are recovered 35 parts of tail gas, 7 parts of water and 22 parts of the xylene recycle stream. Six parts of methanol are introduced. From the foregoing, it will be seen that a self-sustaining operation is provided for production of esters of aromatic carboxylic acid, with internal generation of the acetal.

The present invention is quite important and useful in that a simplified method is provided for simultaneously oxidizing and esterifying polyalkyl benzene. The diesters formed preferentially are important in chemical manufacturing. Thus, the invention has great utility and commercial advantages.

The nature and objects of the present invention having been completely described and illustrated and the best mode thereof set forth, what we wish to claim as new and useful and secure by Letters Patent is:

1. In the liquid phase concurrent oxidation-esterification of p-xylene in a reaction zone in contact with an oxygen-containing gas and a soluble cobalt catalyst at a temperature from 140° C. to 290° C., the improvement of continuously introducing oxygen, methylal, and a p-xylene into said reaction zone as the only externally added components of the reaction mixture, whereby net water formation is minimized.

2. A method which comprises continuously introducing into a reaction zone reactants consisting of p-xylene, a free oxygen-containing gas, and methylal, reacting said reactants in said reaction zone in contact with a soluble cobalt catalyst at a temperature within the range from 140° C. to 290° F., and at a pressure from 200 p.s.i.g. to 1000 p.s.i.g., whereby dimethylterephthalate is produced while minimizing the formation of by-product water, and continuously removing the products of said reaction.

3. A method in accordance with claim 2 wherein the mol ratio of methylal to p-xylene is from 1:1 to about 4:1.

4. A method in accordance with claim 3 wherein the catalyst is cobalt naphthenate.

References Cited in the file of this patent

UNITED STATES PATENTS 2,879,289    Johnson _____ Mar. 24, 1959

OTHER REFERENCES

Lorette et al.: J. Org. Chem., vol. 24, 261–2 (1959).
Fieser et al.: Organic Chemistry (Boston, 1958), p. 215.
Noller: Chemistry of Organic Compounds (Phila., 1957), page 424.